United States Patent
Eckel et al.

(10) Patent No.: US 7,709,573 B2
(45) Date of Patent: May 4, 2010

(54) POLYCARBONATE MOLDING COMPOSITIONS

(75) Inventors: Thomas Eckel, Dormagen (DE); Andreas Seidel, Dormagen (DE); Dieter Wittmann, Leverkusen (DE)

(73) Assignee: Bayer MaterialScience AG, Leverkusen (DE)

( * ) Notice: Subject to any disclaimer, the term of this patent is extended or adjusted under 35 U.S.C. 154(b) by 0 days.

(21) Appl. No.: 11/633,795

(22) Filed: Dec. 5, 2006

(65) Prior Publication Data

US 2007/0135568 A1    Jun. 14, 2007

(30) Foreign Application Priority Data

Dec. 9, 2005    (DE) .................. 10 2005 058 836

(51) Int. Cl.
*C08L 69/00*    (2006.01)
(52) U.S. Cl. .......................................... 525/67; 525/71
(58) Field of Classification Search ............. 525/63
See application file for complete search history.

(56) References Cited

U.S. PATENT DOCUMENTS

| | | | | |
|---|---|---|---|---|
| 4,526,926 A | | 7/1985 | Weber et al. ................. 525/67 |
| 4,624,986 A | | 11/1986 | Weber et al. ................. 525/67 |
| 4,663,389 A | * | 5/1987 | Jones et al. .................. 525/67 |
| 4,677,162 A | | 6/1987 | Grigo et al. .................. 525/67 |
| 4,868,235 A | | 9/1989 | Muehlbach et al. ......... 524/252 |
| 6,306,962 B1 | | 10/2001 | Pham et al. .................. 525/67 |
| 6,423,767 B1 | * | 7/2002 | Weber et al. ................ 524/158 |
| 6,486,241 B2 | | 11/2002 | Sawano ....................... 524/109 |
| 6,503,628 B1 | | 1/2003 | Janarthanan et al. ........ 428/412 |
| 6,545,089 B1 | | 4/2003 | DeRudder et al. ............ 525/63 |
| 6,613,820 B2 | | 9/2003 | Fujiguchi et al. ............ 524/109 |
| 2002/0161111 A1 | | 10/2002 | Sawano ....................... 525/67 |
| 2002/0165300 A1 | | 11/2002 | Fujiguchi et al. ............ 524/141 |

FOREIGN PATENT DOCUMENTS

| | | |
|---|---|---|
| CA | 2081333 | 11/1991 |
| CA | 2159351 | 10/1994 |
| EP | 456 030 A2 | 11/1991 |
| EP | 372 336 B1 | 1/1995 |

* cited by examiner

*Primary Examiner*—Robert Sellers
(74) *Attorney, Agent, or Firm*—Baker, Donelson, Bearman, Caldwell & Berkowitz, PC

(57) ABSTRACT

A thermoplastic molding composition having improved properties is disclosed. The composition comprises polycarbonate resin, a first graft polymer, a first free copolymer, a second graft polymer and a second free copolymer; the weight-average molecular weight of the first free copolymer being lower by at least 32,000 g/mol with regard to that of the second free copolymer. The inventive composition features improved balance of melt flowability and ductility, good resistance to hydrolysis and process stability.

17 Claims, No Drawings

POLYCARBONATE MOLDING COMPOSITIONS

FIELD OF THE INVENTION

The invention relates to thermoplastic molding compositions and in particular to impact-modified polycarbonate compositions.

TECHNICAL BACKGROUND OF THE INVENTION

The inventive impact-modified polycarbonate (PC) compositions are characterized by their excellent low temperature ductility, and improved processing properties expressed by relatively high melt fluidity during injection molding. The inventive compositions have good processing stability at high temperatures, good stability to ageing under damp heat conditions and a good resistance to stress-cracking. An embodiment of the invention relates to flame-resistant compositions which, with a high ductility, are distinguished by improved processing properties characterized by a relatively high melt fluidity during injection molding.

Impact-modified polycarbonate compositions, e.g. those blends with ABS (acrylonitrile/butadiene/styrene), are known for their high ductility at room temperature and low temperatures and good processing properties. However, for realization of demanding uses, in particular complex component geometries, it is often desirable to improve the processing properties further. Conventional measures lead to the desired improvement, however, as a rule cause a deterioration in the toughness and/or resistance to stress-cracking under the influence of media such as solvents, oils, fats etc. This is critical inasmuch as high quality requirements of ductility, in some cases down to low temperatures, are as a rule imposed on components of PC/ABS, e.g. safety parts in automobile construction. In this as also other fields of use of PC/ABS blends, such as, for example, in the case of housing for electronic equipment, the materials often also come into contact with various media (e.g. fats, oils, solvents, skin creams etc.) and should withstand such media influences undamaged for as long as possible, including under mechanical stress.

A further requirement of PC/ABS compositions is an improved processing stability as well as stability to hydrolysis, i.e. long-term stability in a damp heat climate. This is necessary in order to ensure that the mechanical properties are realized at a high level over a wide processing window and are subject to as few changes as possible, including after storage under hot or hot damp conditions.

WO 01/25334 discloses that PC/ABS compositions based on ABS which has been prepared in the bulk polymerization process have good processing stability as well as an improved balance of low temperature toughness and melt flowability. EP 0 900 827 disclosed that PC/ABS compositions based on ABS which has been prepared in the emulsion polymerization process also have good processing stability if the impact modifier prepared in the emulsion process is substantially free from basic components and has been prepared on the basis of specific emulsifiers, such as alkylsulfonates. WO 91/18052 A1 discloses PC/ABS compositions of high heat stability, which are characterized in that the graft polymers have a sodium ion and potassium ion content of less than 1,500 ppm, preferably less than 800 ppm, and comprise a certain amount of antioxidants. WO 99/11713 A1 discloses flameproofed PC/ABS compositions having an improved resistance to moisture and at the same time a high level of mechanical properties, which are characterized in that the graft polymers have a content of alkali metals of less than 1 ppm. In particular, the sodium ion and potassium ion content of the graft polymer should be less than 1 ppm.

Such PC/ABS compositions which comprise a mixture of various ABS graft polymers prepared by different polymerization processes are also known.

U.S. Pat. No. 4,624,986 and U.S. Pat. No. 4,526,926 disclose low gloss compositions containing polycarbonate and graft copolymer. The graft copolymer prepared by bulk polymerization process or by the emulsion polymerization process or mixtures thereof. No limitation is specified relative to molecular weight of the SAN in the ABS employed.

U.S. Pat. No. 4,677,162 discloses thermoplastic compositions which comprise aromatic polycarbonate, a graft copolymer of acrylonitrile/butadiene/styrene (ABS) and an impact modifier. The ABS graft polymer is prepared by the bulk polymerization process and has a polybutadiene content of from 1 to 18 wt. % and an average rubber particle size of greater than 0.75 µm. An elastomer-based graft copolymer preferably prepared by the emulsion process, the elastomer content of which is between 15 and 98 wt. % and the average rubber particle size of which is less than 0.75 µm, is disclosed as the impact modifier. The influence of the molecular weight of the SAN contained in the ABS is not discussed.

EP-A 0 312 929 discloses PC/ABS compositions with mixtures of at least two graft copolymers, the one graft copolymer having been prepared by the emulsion process and being present in excess, based on the total amount in the total elastomer content, and the other graft copolymer having been prepared by another process (e.g. bulk or bulk-suspension polymerization).

WO 94/24210 discloses thermoplastic compositions comprising aromatic polycarbonate, a mixture of at least two graft copolymers, the one graft copolymer having been prepared by the bulk polymerization process and the other graft copolymer having been prepared by the emulsion polymerization process, a copolymer containing epoxide groups and optionally an aromatic copolymer.

EP-A 0 456 030 discloses PC/ABS compositions comprising polycarbonate and a graft polymer component comprising a mixture of bulk graft polymer and emulsion graft polymer, the content of emulsion graft polymer in the graft polymer component being 10-50 wt. %.

EP 0 372 336 A2 discloses PC/ABS compositions having a high toughness at low temperatures, which are characterized in that the graft polymers and/or the copolymers are replaced at least in part by graft polymers and/or copolymers in which the graft base and/or the copolymer comprises at least 86 wt. % of vinylaromatics. Nothing is said about the molecular weights of SAN in the various graft polymers and copolymers.

WO 99/65991 discloses impact-modified polycarbonate compositions having improved galvanizing properties which comprise a mixture of two graft copolymers, the one graft polymer comprising free SAN copolymer having an average molecular weight of from 50,000 to 150,000 g/mol. The examples disclose compositions comprising a graft polymer mixture which differ in the average molecular weight of the free SAN copolymer contained in the particular graft polymer by up to 30,000 g/mol.

The object on which the invention is based is to provide PC/ABS molding compositions for the production of complex moldings which have an improved balance of toughness, including at low temperatures, and melt flowability and moreover have a good resistance to ageing under the influence of a damp heat climate, a good processing stability and a good resistance to chemicals. The object of the invention is furthermore to provide flame-resistant molding compositions of high toughness and improved melt flowability.

SUMMARY OF THE INVENTION

A thermoplastic molding composition having improved properties is disclosed. The composition comprises polycarbonate resin, a first graft polymer, a first free copolymer, a second graft polymer and a second free copolymer; the weight-average molecular weight of the first free copolymer being lower by at least 32,000 g/mol with regard to that of the second free copolymer. The inventive composition features improved balance of melt flowability and ductility, good resistance to hydrolysis and process stability.

DETAILED DESCRIPTION OF THE INVENTION

It has been found, surprisingly, that the abovementioned objective is achieved by impact-modified polycarbonate compositions which comprise a mixture of at least two graft polymer types, each comprising free (i.e. not bonded chemically to the rubber) (co)polymer, and optionally added (co)polymer, the weight-average molecular weight of the free (co)polymer in the first graft polymer being lower with regard to the weight-average molecular weight of the free (co)polymer in the second graft polymer or, in the case of the addition of further (co)polymer, from the weight-average molecular weight of the mixture of the free (co)polymer of the second graft polymers and the added (co)polymer by at least 32,000 g/mol, preferably at least 40,000 g/mol, and in particular at least 60,000 g/mol.

The present invention therefore provides compositions comprising

A) aromatic polycarbonate and/or polyester carbonate,
B) a first graft polymer,
C) a second graft polymer,
D) optionally a (co)polymer and
E) optionally flameproofing agents, wherein the weight-average molecular weight of the free (co)polymer in graft polymer B is lower by at least 32,000 g/mol, preferably by at least 40,000 g/mol, in particular by at least 60,000 g/mol with regard to the weight-average molecular weight of the mixture of the free (co)polymer in graft polymer C and of (co)polymer D.

In a preferred embodiment, the content of graft polymer B in the total of graft polymers and (co)polymers B+C+D is 15 to 85 wt. %, in particular 20 to 80 wt. %, particularly preferably 25 to 75 wt. %.

Preferred compositions according to the invention are those in which component B, and in a particularly preferred embodiment both graft polymers B and C, have been prepared by the bulk, solution or bulk-suspension polymerization process.

Preferably, the compositions according to the invention comprise

A) 25 to 85 parts by wt., preferably 35 to 80 parts by wt., particularly preferably 40 to 75 parts by wt. of aromatic polycarbonate and/or polyester carbonate and B) 1 to 60 parts by wt., preferably 2 to 50, particularly preferably 3 to 40 parts by wt. of a first rubber-modified graft polymer which preferably comprises free, i.e. not bonded chemically to the rubber, copolymer having a weight-average molecular weight of from 60,000 to 99,000, preferably 70,000 to 98,000 g/mol, particularly preferably 70,000 to 90,000 g/mol, C) 1 to 60 parts by wt., preferably 2 to 50 parts by wt., particularly preferably 3 to 40 parts by wt. of a second rubber-modified graft polymer, D) 0 to 40 parts by wt., preferably 0 to 30 parts by wt., particularly preferably 3 to 20 parts by wt. of a (co)polymer and E) 0 to 30 parts by wt., preferably 1 to 25 parts by wt., particularly preferably 2 to 20 parts by wt. of a flameproofing agent, wherein the weight-average molecular weight of the free (co)polymer in graft polymer B is lower by at least 32,000 g/mol, preferably at least 40,000 g/mol, in particular at least 60,000 g/mol with regard to the weight-average molecular weight of the mixture of the free (co)polymer in graft polymer C and of (co)polymer D and the sum of the parts by weight (pbw) of components A+B+C+D+E is standardized to 100.

Either a mixture of two graft polymers prepared in the bulk, solution or bulk-suspension polymerization process, or a mixture of one graft polymer prepared in the bulk, solution or bulk-suspension polymerization process and one prepared in the emulsion process, or a mixture of two graft polymers prepared in the emulsion process is employed as graft polymers B) and C), graft polymers B) and C) preferably being free from constituents or process-related impurities which catalytically degrade the polycarbonate, in particular under damp heat conditions.

In a particularly preferred embodiment, at least one of components B or C, preferably component B, is a graft polymer which has been prepared in the bulk, solution or bulk-suspension polymerization process. Those compositions according to the invention in which both graft polymers B and C are prepared in the bulk, solution or bulk-suspension polymerization process are particularly preferred.

Component A

Aromatic polycarbonates and/or aromatic polyester carbonates according to component A which are suitable according to the invention are known from the literature or may be prepared by processes known from the literature (for the preparation of aromatic polycarbonates see, for example, Schnell, "Chemistry and Physics of Polycarbonates", Interscience Publishers, 1964 and DE-AS 1 495 626, DE-A 2 232 877, DE-A 2 703 376, DE-A 2 714 544, DE-A 3 000 610 and DE-A 3 832 396; for the preparation of aromatic polyester carbonates e.g. DE-A 3 077 934).

The preparation of aromatic polycarbonates is carried out e.g. by reaction of diphenols with carbonic acid halides, preferably phosgene, and/or with aromatic dicarboxylic acid dihalides, preferably benzenedicarboxylic acid dihalides, by the phase interface process, optionally using chain terminators, for example monophenols, and optionally using branching agents which are trifunctional or more than trifunctional, for example triphenols or tetraphenols. A preparation via a melt polymerization process by reaction of diphenols with, for example, diphenyl carbonate is also possible.

Diphenols for the preparation of the aromatic polycarbonates and/or aromatic polyester carbonates are preferably those of the formula (I)

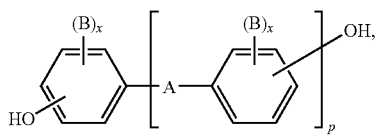

(I)

wherein

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, on to which further aromatic rings optionally containing heteroatoms may be fused, or a radical of the formula (II) or (III)

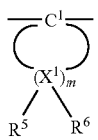

(II)

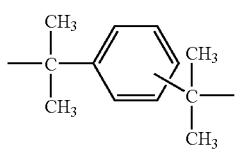

(III)

B in each case is $C_1$ to $C_{12}$-alkyl, preferably methyl, or halogen, preferably chlorine and/or bromine, x in each case independently of one another, is 0, 1 or 2, p is 1 or 0 and $R^5$ and $R^6$ individually for each $X^1$ and independently of one another denote hydrogen or $C_1$ to $C_6$-alkyl, preferably hydrogen, methyl or ethyl, $X^1$ denotes carbon and m denotes an integer from 4 to 7, preferably 4 or 5, with the proviso that on at least one atom $X^1 R^5$ and $R^6$ are simultaneously alkyl.

Preferred diphenols are hydroquinone, resorcinol, dihydroxydiphenols, bis-(hydroxyphenyl)-$C_1$-$C_5$-alkanes, bis-(hydroxyphenyl)-$C_5$-$C_6$-cycloalkanes, bis-(hydroxyphenyl) ethers, bis-(hydroxyphenyl) sulfoxides, bis-(hydroxyphenyl) ketones, bis-(hydroxyphenyl) sulfones and α,α-bis-(hydroxyphenyl)-diisopropyl-benzenes and nucleus-brominated and/or nucleus-chlorinated derivatives thereof. Particularly preferred diphenols are 4,4'-dihydroxydiphenyl, bisphenol A, 2,4-bis-(4-hydroxyphenyl)-2-methylbutane, 1,1-bis-(4-hydroxyphenyl)-cyclohexane, 1,1-bis-(4-hydroxyphenyl)-3,3, 5-trimethylcyclohexane, 4,4'-dihydroxydiphenyl sulfide, 4,4'-dihydroxydiphenyl sulfone and di- and tetrabrominated or chlorinated derivatives thereof, such as, for example, 2,2-bis-(3-chloro-4-hydroxyphenyl)-propane, 2,2-bis-(3,5-dichloro-4-hydroxyphenyl)-propane or 2,2-bis-(3,5-dibromo-4-hydroxyphenyl)-propane. 2,2-Bis-(4-hydroxyphenyl)-propane (bisphenol A) is particularly preferred.

The diphenols may be employed individually or as any desired mixtures. The diphenols are known from the literature or obtainable by processes known from the literature.

Chain terminators which are suitable for the preparation of the thermoplastic, aromatic polycarbonates are, for example, phenol, p-chlorophenol, p-tert-butylphenol or 2,4,6-tribromophenol, and also long-chain alkylphenols, such as 4-[2-(2, 4,4-trimethylpentyl)]-phenol, 4-(1,3-tetramethylbutyl)-phenol according to DE-A 2 842 005 or monoalkylphenols or dialkylphenols having a total of 8 to 20 carbon atoms in the alkyl substituents, such as 3,5-di-tert-butylphenol, p-iso-octylphenol, p-tert-octylphenol, p-dodecylphenol and 2-(3,5-dimethylheptyl)-phenol and 4-(3,5-dimethylheptyl)-phenol. The amount of chain terminators to be employed is in general between 0.5 mol % and 10 mol %, based on the sum of the moles of the particular diphenols employed.

The thermoplastic, aromatic polycarbonates have average weight-average molecular weights ($M_w$, measured e.g. by ultracentrifuge or scattered light measurement) of from 10,000 to 200,000 g/mol, preferably 15,000 to 80,000 g/mol, particularly preferably 24,000 to 32,000 g/mol.

The thermoplastic, aromatic polycarbonates may be branched in a known manner, and in particular preferably by incorporation of from 0.05 to 2.0 mol %, based on the sum of the diphenols employed, of compounds which are trifunctional or more than trifunctional, for example those having three and more phenolic groups.

Both homopolycarbonates and copolycarbonates are suitable. It is also possible for 1 to 25 wt. %, preferably 2.5 to 25 wt. %, based on the total amount of diphenols to be employed, of polydiorganosiloxanes having hydroxyaryloxy end groups to be employed for the preparation of copolycarbonates according to the invention according to component A. These are known (U.S. Pat. No. 3,419,634) and may be prepared by processes known from the literature. The preparation of copolycarbonates containing polydiorganosiloxanes is described in DE-A 3 334 782.

Preferred polycarbonates are, in addition to the bisphenol A homopolycarbonates, the copolycarbonates of bisphenol A with up to 15 mol %, based on the sum of the moles of diphenols, of other diphenols mentioned as preferred or particularly preferred, in particular 2,2-bis-(3,5-dibromo-4-hydroxyphenyl)-propane.

Aromatic dicarboxylic acid dihalides for the preparation of aromatic polyester carbonates are preferably the diacid dichlorides of isophthalic acid, terephthalic acid, diphenyl ether-4,4'-dicarboxylic acid and of naphthalene-2,6-dicarboxylic acid.

Mixtures of the diacid dichlorides of isophthalic acid and of terephthalic acid in a ratio of between 1:20 and 20:1 are particularly preferred.

A carbonic acid halide, preferably phosgene, is additionally co-used as a bifunctional acid derivative in the preparation of polyester carbonates.

Possible chain terminators for the preparation of the aromatic polyester carbonates are, in addition to the monophenols already mentioned, also chlorocarbonic acid esters thereof as well as the acid chlorides of aromatic monocarboxylic acids, which may optionally be substituted by $C_1$ to $C_{22}$-alkyl groups or by halogen atoms, as well as aliphatic $C_2$ to $C_{22}$-monocarboxylic acid chlorides.

The amount of chain terminators is in each case 0.1 to 10 mol %, based on the moles of diphenol in the case of the phenolic chain terminators and on the moles of dicarboxylic acid dichloride in the case of monocarboxylic acid chloride chain terminators.

The aromatic polyester carbonates may also contain incorporated aromatic hydroxycarboxylic acids.

The aromatic polyester carbonates may be either linear or branched in a known manner (in this context see DE-A 2 940 024 and DE-A 3 007 934).

Branching agents which may be used are, for example, carboxylic acid chlorides which are trifunctional or more than trifunctional, such as trimesic acid trichloride, cyanuric acid trichloride, 3,3',4,4'-benzophenone-tetracarboxylic acid tetrachloride, 1,4,5,8-naphthalenetetracarboxylic acid tetrachloride or pyromellitic acid tetrachloride, in amounts of from 0.01 to 1.0 mol % (based on the dicarboxylic acid dichlorides employed), or phenols which are trifunctional or more than trifunctional, such as phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, tetra-(4-hydroxyphenyl)-methane, 2,6-bis-(2-hydroxy-5-methyl-benzyl)-4-methylphenol, 2-(4-hydroxyphenyl)-2-(2,4-dihydroxyphenyl)-propane, tetra-(4-[4-hydroxyphenyl-isopropyl]-phenoxy)-methane and 1,4-bis-[4,4'-dihydroxytriphenyl)-methyl]-benzene, in amounts of from 0.01 to 1.0 mol %, based on the diphenols employed. Phenolic branching agents may be initially introduced into the reaction vessel with the diphenols, and acid chloride branching agents may be introduced together with the acid dichlorides.

The content of carbonate structural units in the thermoplastic, aromatic polyester carbonates may be varied as desired. Preferably, the content of carbonate groups is up to 100 mol %, in particular up to 80 mol %, particularly preferably up to 50 mol %, based on the sum of ester groups and carbonate groups. Both the ester and the carbonate content of the aromatic polyester carbonates may be present in the polycondensate in the form of blocks or in random distribution.

The relative solution viscosity ($\eta_{rel}$) of the aromatic polycarbonates and polyester carbonates is in the range of 1.18 to 1.4, preferably 1.20 to 1.32 (measured on solutions of 0.5 g polycarbonate or polyester carbonate in 100 ml methylene chloride solution at 25° C.).

The thermoplastic, aromatic polycarbonates and polyester carbonates may be employed by themselves or in any desired mixture.

Component B

Component B comprises graft polymers of

B.1) 5 to 95 wt. %, preferably 30 to 90 wt. %, based on component B, of a mixture of B.1.1) 65 to 85 wt. %, preferably 70 to 80 wt. %, based on B.1, of at least one monomer selected from the group consisting of vinylaromatics (such as, for example, styrene, α-methylstyrene), nucleus-substituted vinylaromatics (such as, for example, p-methylstyrene, p-chlorostyrene) and methacrylic acid ($C_1$-$C_8$)-alkyl esters (such as, for example, methyl methacrylate, ethyl methacrylate) and B.1.2) 15 to 35 wt. %, preferably 20 to 30 wt. %, based on B.1, of at least one monomer selected from the group consisting of vinyl cyanides (such as, for example, unsaturated nitriles, such as acrylonitrile and methacrylonitrile), (meth)acrylic acid ($C_1$-$C_8$)-alkyl esters (such as, for example, methyl methacrylate, n-butyl acrylate, tert-butyl acrylate) and derivatives (such as, for example, anhydrides and imides) of unsaturated carboxylic acids (for example maleic anhydride and N-phenyl-maleimide)

with the proviso that B.1.1 differs from B.1.2, on

B.2) 95 to 5 wt. %, preferably 70 to 10 wt. % of at least one graft base having a glass transition temperature of <0° C., preferably <−20° C., the graft base B.2) in general having an median particle size ($d_{50}$ value) of from 0.05 to 10 μm, preferably 0.1 to 5 μm, particularly preferably 0.15 to 1.5 μm.

The median particle size $d_{50}$ is the diameter above and below which in each case 50 wt. % of the particles lie. It may be determined by means of ultracentrifuge measurement (W. Scholtan, H. Lange, Kolloid, Z. und Z. Polymere 250 (1972), 782-1796).

Preferred monomers B.1.1 are selected from at least one of the monomers styrene, α-methylstyrene and methyl methacrylate, and preferred monomers B.1.2 are selected from at least one of the monomers acrylonitrile, maleic anhydride and methyl methacrylate.

Particularly preferred monomers are B.1.1 styrene and B.1.2 acrylonitrile.

Graft bases B.2 which are suitable for graft polymers B are, for example, diene rubbers, diene/vinyl block copolymer rubbers, EP(D)M rubbers, that is to say those based on ethylene/propylene and optionally diene, and acrylate, polyurethane, silicone, chloroprene and ethylene/vinyl acetate rubbers, as well as mixtures of such rubbers, or silicon/acrylate composite rubbers in which the silicone and the acrylate components are linked to one another chemically (e.g. by grafting).

Preferred graft bases B.2 are diene rubbers (e.g. based on butadiene or isoprene), diene/vinyl block copolymer rubbers (e.g. based on blocks of butadiene and styrene), copolymers of diene rubbers with further copolymerizable monomers (e.g. according to B.1.1 and B.1.2) and mixtures of the abovementioned rubber types. Pure polybutadiene rubber and styrene/butadiene block copolymer rubber are particularly preferred.

The gel content of the graft polymers is at least 15 wt. %, preferably at least 20 wt. % (measured in acetone). The gel content of the graft polymers is determined at 25° C. in a suitable solvent (M. Hoffmann, H. Krömer, R. Kuhn, Polymeranalytik I und II, Georg Thieme-Verlag, Stuttgart 1977).

Particularly preferred polymers B are e.g. ABS polymers prepared by free-radical polymerization (emulsion, bulk and suspension ABS), such as are described e.g. in DE-A 2 035 390 (=U.S. Pat. No. 3,644,574) or in DE-A 2 248 242 (=GB 1 409 275) and in Ullmanns, Enzyklopädie der Technischen Chemie, vol. 19 (1980), p. 280 et seq.

Graft polymer B includes free, i.e. not bonded chemically to the rubber base, copolymer of B.1.1 and B.1.2, which is distinguished in that it may be dissolved in suitable solvents (e.g. acetone).

Graft polymer B preferably comprises a free copolymer of B.1.1 and B.1.2 which has a weight-average molecular weight (Mw), determined by gel permeation chromatography, of from 60,000 to 99,000 g/mol, preferably from 70,000 to 98,000 g/mol, particularly preferably 70,000 to 90,000 g/mol.

Component B is preferably free from constituents or process-related impurities which catalyse the degradation of the polycarbonate, in particular under damp heat conditions. In particular, component B is therefore free from basic compounds, such as, for example, alkali metal and alkaline earth metal salts of carboxylic acids and carboxylic acid derivatives, in particular salts of fatty acids, and free from amines, amides and metal carbonates. Such compounds are employed, for example, as polymerization auxiliaries in emulsion polymerization, or for addition to graft polymers.

Graft polymer B is particularly preferably prepared in the bulk, solution or bulk-suspension polymerization process.

In a preferred embodiment, graft polymer B is an ABS which is prepared in the bulk, solution or bulk-suspension polymerization process and is based on a butadiene/styrene block copolymer rubber having a rubber content of from 10 to 25 wt. % and a graft shell which comprises, in each case based on the monomers of the graft shell, 22 to 27 wt. % of acrylonitrile and 73 to 78 wt. % of styrene, and the graft polymer has a gel content (measured in acetone) of from 20 to 30 wt. %.

Component C

Component C comprises graft polymers of

C.1) 5 to 95 wt. %, preferably 30 to 90 wt. %, based on component C, of a mixture of
   C.1.1) 65 to 85 wt. %, preferably 70 to 80 wt. %, based on C.1, of at least one monomer selected from the group consisting of vinylaromatics (such as, for example, styrene, α-methylstyrene), nucleus-substituted vinylaromatics (such as, for example, p-methylstyrene, p-chlorostyrene) and methacrylic acid ($C_1$-$C_8$)-alkyl esters (such as, for example, methyl methacrylate, ethyl methacrylate) and
   C.1.2) 15 to 35 wt. %, preferably 20 to 30 wt. %, based on C.1, of at least one monomer selected from the group consisting of vinyl cyanides (such as, for example, unsaturated nitrites, such as acrylonitrile and methacrylonitrile), (meth)acrylic acid ($C_1$-$C_8$)-alkyl esters (such as, for example, methyl methacrylate, n-butyl acrylate, tert-butyl acrylate) and derivatives (such as, for example, anhydrides and imides) of unsaturated carboxylic acids (for example maleic anhydride and N-phenyl-maleimide)
   with the proviso that C.1.1 differs from C.1.2,
on C.2) 95 to 5 wt. %, preferably 70 to 10 wt. % of at least one graft base having a glass transition temperature of <0° C., preferably <−20° C., the graft base C.2) in general having an median particle size ($d_{50}$ value) of from 0.05 to 10 μm, preferably 0.1 to 5 μm, particularly preferably 0.15 to 1.5 μm.

The median particle size $d_{50}$ is the diameter above and below which in each case 50 wt. % of the particles lie. It may be determined by means of ultracentrifuge measurement (W. Scholtan, H. Lange, Kolloid, Z. und Z. Polymere 250 (1972), 782-1796).

Preferred monomers C.1.1 are selected from at least one of the monomers styrene, α-methylstyrene and methyl methacrylate, and preferred monomers C.1.2 are selected from at least one of the monomers acrylonitrile, maleic anhydride and methyl methacrylate.

Particularly preferred monomers are C.1.1 styrene and C.1.2 acrylonitrile.

Graft bases C.2 which are suitable for graft polymers C are, for example, diene rubbers, diene/vinyl block copolymer rubbers, EP(D)M rubbers, that is to say those based on ethylene/propylene and optionally diene, and acrylate, polyurethane, silicone, chloroprene and ethylene/vinyl acetate rubbers, as well as mixtures of such rubbers, or silicon/acrylate composite rubbers in which the silicone and the acrylate components are linked to one another chemically (e.g. by grafting).

Preferred graft bases C.2 are diene rubbers (e.g. based on butadiene or isoprene), diene/vinyl block copolymer rubbers (e.g. based on blocks of butadiene and styrene), copolymers of diene rubbers with further copolymerizable monomers (e.g. according to C.1.1 and C.1.2) and mixtures of the abovementioned rubber types. Pure polybutadiene rubber and styrene/butadiene block copolymer rubber are particularly preferred.

The gel content of graft polymers C is at least 15 wt. %, preferably at least 20 wt. % (measured in acetone). The gel content of the graft polymers is determined at 25° C. in a suitable solvent (M. Hoffmann, H. Krömer, R. Kuhn, Polymeranalytik I und II, Georg Thieme-Verlag, Stuttgart 1977).

Particularly preferred polymers C are e.g. ABS polymers prepared by free-radical polymerization (emulsion, bulk and suspension ABS), such as are described e.g. in DE-A 2 035 390 (=U.S. Pat. No. 3,644,574) or in DE-A 2 248 242 (=GB 1 409 275) and in Ullmanns, Enzyklopädie der Technischen Chemie, vol. 19 (1980), p. 280 et seq.

Graft polymer C includes free, i.e. not bonded chemically to the rubber base, copolymer of C.1.1 and C.1.2, which is distinguished in that it may be dissolved in suitable solvents (e.g. acetone).

The free copolymer of C.1.1 and C.1.2 in component C has a higher weight-average molecular weight than the free copolymer of B.1.1 and B.1.2 in component B, the molecular weights, determined by gel permeation chromatography, of the free copolymers in the two components B and C differing from one another by at least 32,000 g/mol, preferably at least 40,000 g/mol, in particular at least 60,000 g/mol.

Component C is preferably free from constituents or process-related impurities which catalyse the degradation of the polycarbonate, in particular under damp heat conditions. In particular, component C is therefore free from basic compounds, such as, for example, alkali metal and alkaline earth metal salts of carboxylic acids and carboxylic acid derivatives, in particular salts of fatty acids, and free from amines, amides and metal carbonates. Such compounds are employed, for example, as polymerization auxiliaries in emulsion polymerization, or for addition to graft polymers.

If component C is a graft polymer prepared in the emulsion process, preferably either no emulsifier is added in the grafting step in the preparation of the graft polymer, or an acid or the salt of a strong acid is employed as an emulsifier. Suitable emulsifiers which may be mentioned are, in particular, alkyl-, aryl- or alkylarylsulfonic acids or salts of these compounds, alkyl, aryl or alkylaryl sulfates, alkyl-, aryl- or alkylarylphosphoric acids or salts of these compounds or mixtures of the abovementioned compounds.

Graft polymer C is particularly preferably prepared in the bulk, solution or bulk-suspension polymerization process.

Component D

The composition may comprise, as a further component D, (co)polymers of at least one monomer from the group consisting of vinylaromatics, vinyl cyanides (unsaturated nitrites), (meth)acrylic acid ($C_1$ to $C_8$)-alkyl esters, unsaturated carboxylic acids and derivatives (such as anhydrides and imides) of unsaturated carboxylic acids.

(Co)polymers D) which are particularly suitable are those of

D.1 50 to 99 wt. %, preferably 65 to 85 wt. %, particularly preferably 70 to 80 wt. %, based on (co)polymer D), of at least one monomer selected from the group consisting of vinylaromatics (such as, for example, styrene, α-methylstyrene), nucleus-substituted vinylaromatics (such as, for example, p-methylstyrene, p-chlorostyrene) and (meth)acrylic acid ($C_1$-$C_8$)-alkyl esters (such as, for example, methyl methacrylate, n-butyl acrylate, tert-butyl acrylate) and D.2 1 to 50 wt. %, preferably 15 to 35 wt. %, particularly preferably 20 to 30 wt. %, based on (co)polymer D), of at least one monomer selected from the group consisting of vinyl cyanides (such as, for example, unsaturated nitrites, such as acrylonitrile and methacrylonitrile), (meth)acrylic acid ($C_1$-$C_8$)-alkyl esters (such as, for example, methyl methacrylate, n-butyl acrylate, tert-butyl acrylate), unsaturated carboxylic acids and derivatives of unsaturated carboxylic acids (for example maleic anhydride and N-phenyl-maleimide), with the proviso that D.1 differs from D.2.

These (co)polymers D) are resinous, thermoplastic and rubber-free. The copolymer of D.1 styrene and D.2 acrylonitrile is particularly preferred.

Such (co)polymers D) are known and may be prepared by free-radical polymerization, in particular by emulsion, suspension, solution or bulk polymerization. The (co)polymers D) preferably have average molecular weights $M_w$ (weight-average, determined by gel permeation chromatography) of between 50,000 and 200,000 g/mol, preferably between 80,000 and 200,000 g/mol, particularly preferably between 100,000 and 200,000 g/mol.

Component E

Flameproofing agents, for example halogenated organic compounds or phosphorus-containing flameproofing agents, may be added to the compositions according to the invention as component E. The latter flameproofing agents are preferably employed.

Phosphorus-containing flameproofing agents (E) in the context according to the invention are preferably selected from the groups consisting of mono- and oligomeric phosphoric and phosphonic acid esters, phosphonatamines and phosphazenes, also suitable are mixtures of several components selected from one or various of these groups as flameproofing agents. Other halogen-free phosphorus compounds which are not mentioned here specifically may also be employed, by themselves or in any desired combination with other halogen-free phosphorus compounds.

Preferred mono- and oligomeric phosphoric and phosphonic acid esters are phosphorus compounds of the general formula (IV)

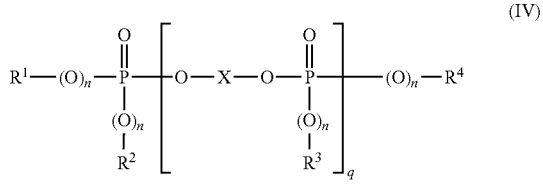

(IV)

wherein
$R^1, R^2, R^3$ and $R^4$ independently of one another denote in each case optionally halogenated $C_1$ to $C_8$-alkyl, in each case optionally alkyl-, preferably $C_1$ to $C_4$-alkyl-, and/or halogen-, preferably chorine- or bromine-substituted $C_5$ to $C_6$-cycloalkyl, $C_6$ to $C_{12}$-aryl or $C_7$ to $C_{12}$-aralkyl,
n independently of one another, denotes 0 or 1
q denotes 0 to 30 and
X denotes a mono- or polynuclear aromatic radical having 6 to 30 C atoms or a linear or branched aliphatic radical having 2 to 30 C atoms, which may be OH-substituted and may contain up to 8 ether bonds.

Preferably, $R^1, R^2, R^3$ and $R^4$ independently of one another represent $C_1$ to $C_4$-alkyl, phenyl, naphthyl or phenyl-$C_1$-$C_4$-alkyl. The aromatic groups $R^1, R^2, R^3$ and $R^4$ may in their turn be substituted by halogen and/or alkyl groups, preferably chlorine, bromine and/or $C_1$ to $C_4$-alkyl. Particularly preferred aryl radicals are cresyl, phenyl, xylenyl, propylphenyl or butylphenyl and the corresponding brominated and chlorinated derivatives thereof.

X in the formula (IV) preferably denotes a mono- or polynuclear aromatic radical having 6 to 30 C atoms. This is preferably derived from diphenols of the formula (I).

n in the formula (IV) may be, independently of one another, 0 or 1, and n is preferably 1.

q represents values of from 0 to 30. If mixtures of various components of the formula (IV) are employed, mixtures preferably having number-average q values of from 0.3 to 20, particularly preferably 0.5 to 10, in particular 1.05 to 1.4, may be used.

x particularly preferably represents

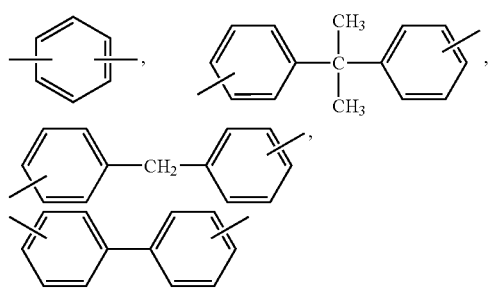

or chlorinated or brominated derivatives thereof, and in particular X is derived from resorcinol, hydroquinone, bisphenol A or diphenylphenol. X is particularly preferably derived from bisphenol A.

The use of oligomeric phosphoric acid esters of the formula (IV) which are derived from bisphenol A is particularly advantageous, since the compositions provided with this phosphorus compound have a particularly high resistance to stress-cracking and hydrolysis and a particularly low tendency towards the formation of deposits during processing by injection molding. Furthermore, a particularly high heat distortion point may be achieved with these flameproofing agents.

Monophosphates (q=0), oligophosphates (q=1-30) or mixtures of mono- and oligophosphates may be employed as component E according to the invention.

Monophosphorus compounds of the formula (IV) are, in particular, tributyl phosphate, tris-(2-chloroethyl) phosphate, tris-(2,3-dibromopropyl) phosphate, triphenyl phosphate, tricresyl phosphate, diphenyl cresyl phosphate, diphenyl octyl phosphate, diphenyl 2-ethylcresyl phosphate, tri-(isopropylphenyl) phosphate, halogen-substituted aryl phosphates, methylphosphonic acid dimethyl ester, methylphosphenic acid diphenyl ester, phenylphosphonic acid diethyl ester, triphenylphosphine oxide or tricresylphosphine oxide.

The phosphorus compounds according to component E formula (IV) are known (cf. e.g. EP-A 363 608, EP-A 640 655) or may be prepared by known methods in an analogous manner (e.g. Ullmanns Enzyklopädie der technischen Chemie, vol. 18, p. 301 et seq. 1979; Houben-Weyl, Methoden der organischen Chemie, vol. 12/1, p. 43; Beilstein vol. 6, p. 177).

The mean q values may be determined by determining the composition of the phosphate mixture (molecular weight distribution) by means of a suitable method (gas chromatography (GC), high pressure liquid chromatography (HPLC) or gel permeation chromatography (GPC)), and calculating the mean values for q therefrom.

Phosphonatamines are preferably compounds of the formula (V)

$$A_{3-y}\text{-NB}^1{}_y \qquad\qquad\qquad (V)$$

in which

A represents a radical of the formula (Va)

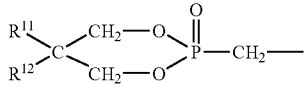

or (Vb)

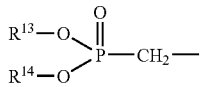

$R^{11}$ and $R^{12}$ independently of one another represent unsubstituted or substituted $C_1$-$C_{10}$-alkyl or unsubstituted or substituted $C_6$ to $C_{10}$-aryl, $R^{13}$ and $R^{14}$ independently of one another represent unsubstituted or substituted $C_1$ to $C_{10}$-alkyl or unsubstituted or substituted $C_6$ to $C_{10}$-aryl or $R^{13}$ and $R^{14}$ together represent unsubstituted or substituted $C_3$ to $C_{10}$-alkylene, y denote 0, 1 or 2 and $B^1$ independently represents hydrogen, optionally halogenated $C_2$ to $C_8$-alkyl or unsubstituted or substituted $C_6$ to $C_{10}$-aryl.

$B^1$ preferably independently represents hydrogen, or ethyl or n- or iso-propyl, which may be substituted by halogen, or unsubstituted or $C_1$ to $C_4$-alkyl- and/or halogen-substituted $C_6$ to $C_{10}$-aryl, in particular phenyl or naphthyl.

Alkyl in $R^{11}$, $R^{12}$, $R^{13}$ and $R^{14}$ independently preferably represents methyl, ethyl, n-propyl, iso-propyl, n-, iso-, sec- or tert-butyl, pentyl or hexyl.

Substituted alkyl in $R^{11}$, $R^{12}$, $R^{13}$ and $R^{14}$ independently preferably represents C to $C_{10}$-alkyl substituted by halogen, in particular mono- or disubstituted methyl, ethyl, n-propyl, iso-propyl, n-, iso-, sec- or tert-butyl, pentyl or hexyl.

$C_6$ to $C_{10}$-aryl in $R^{11}$, $R^{12}$, $R^{13}$ and $R^{14}$ independently preferably represents phenyl, naphthyl or binaphthyl, in particular o-phenyl, o-naphthyl, o-binaphthyl, which may be (in general mono-, di- or tri-)substituted by halogen.

$R^{13}$ and $R^{14}$, together with the oxygen atoms to which they are bonded directly and the phosphorus atom, may form a ring structure.

Compounds which are mentioned by way of example and are preferred are: 5,5,5',5',5'',5''-hexamethyltris(1,3,2-dioxaphosphorinane-methane)amino-2,2',2''-trioxide of the formula (Va-1)

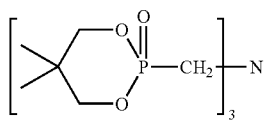

1,3,2-dioxaphosphorinane-2-methanamine, N-butyl-N-[(5,5-dimethyl-1,3,2-dioxaphosphorinan-2-yl)methyl]-5,5-dimethyl-, P,2-dioxide; 1,3,2-dioxaphosphorinane-2-methanamine, N-[[5,5-dimethyl-1,3,2-dioxaphosphorinan-2-yl)methyl]-5,5-dimethyl-N-phenyl-, P,2-dioxide; 1,3,2-dioxaphosphorinane-2-methanamine, N,N-dibutyl-5,5-dimethyl-, 2-oxide, 1,3,2-dioxaphosphorinane-2-methanimine, N-[(5,5-dimethyl-1,3,2-dioxaphosphorinan-2-yl)methyl]-N-ethyl-5,5-dimethyl-, P,2-dioxide, 1,3,2-dioxaphosphorinane-2-methanamine, N-butyl-N-[(5,5-dichloromethyl-1,3,2-dioxaphosphorinan-2-yl)-methyl]-5,5-dichloromethyl-, P,2-dioxide, 1,3,2-dioxaphosphorinane-2-methanamine, N-[(5,5-dichloromethyl-1,3,2-dioxaphosphorinan-2-yl)methyl]-5,5-dichloromethyl-N-phenyl-, P,2-dioxide; 1,3,2-dioxaphosphorinane-2-methanamine, N,N-di-(4-chlorobutyl)-5,5-dimethyl-, 2-oxide; 1,3,2-dioxaphosphorinane-2-methanimine, N-[(5,5-dimethyl-1,3,2-dioxaphosphorinan-2-yl)methane]-N-(2-chloroethyl)-5,5-di(chloromethyl)-, P,2-dioxide.

Compounds which are furthermore preferred are:

Compounds of the formula (Va-2) or (Va-3)

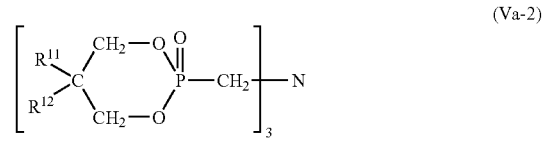

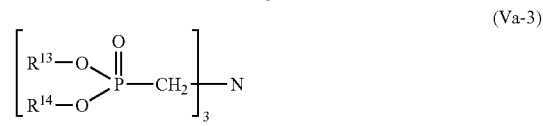

wherein $R^{11}$, $R^{12}$, $R^{13}$ and $R^{14}$ have the abovementioned meanings.

Compounds of the formula (Va-2) and (Va-1) are particularly preferred. The preparation of the phosphonatamines is described, for example, in U.S. Pat. No. 5,844,028.

Phosphazenes are compounds of the formulae (VIa) and (VIb)

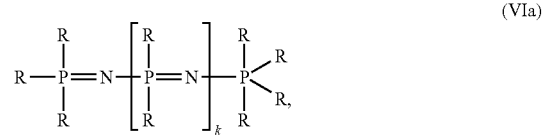

wherein

R in each case is identical or different and represents amino, in each case optionally halogenated, preferably halogenated with fluorine, $C_1$ to $C_8$-alkyl, or $C_1$ to $C_8$-alkoxy, in each case optionally alkyl-, preferably $C_1$ to $C_4$-alkyl-, and/or halogen-, preferably chlorine- and/or bromine-substituted $C_5$ to $C_6$-cycloalkyl, $C_6$ to $C_{20}$-aryl, preferably phenyl or naphthyl, $C_6$ to $C_{20}$-aryloxy, preferably phenoxy or naphthyloxy, or $C_7$ to $C_{12}$-aralkyl, preferably phenyl-$C_1$-$C_4$-alkyl, k represents 0 or a number from 1 to 15, preferably a number from 1 to 10.

Examples which may be mentioned are propoxyphosphazene, phenoxyphosphazene, methylphenoxphosphazene, aminophosphazene and fluoroalkylphosphazenes. Phenoxyphosphazene is preferred.

The phosphazenes may be employed by themselves or as a mixture. The radical R may always be identical, or 2 or more radicals in the formulae (Ia) and (Ib) may be different. Phosphazenes and their preparation are described, for example, in EP-A 728 811, DE-A 1 961668 and WO 97/40092.

The flameproofing agents may be employed by themselves or in any desired mixture with one another or in a mixture with other flameproofing agents.

Component F

The composition may moreover comprise further conventional polymer additives (component F), such as flameproofing synergists, antidripping agents (for example compounds of the substance classes of fluorinated polyolefins, silicones and aramid fibers), lubricants and mold release agents (for example pentaerythritol tetrastearate), nucleating agents, antistatics, stabilizers, fillers and reinforcing substances (for example glass fibers or carbon fibers, mica, kaolin, talc, $CaCO_3$ and glass flakes) as well as dyestuffs and pigments.

Preparation of the Molding Compositions and Shaped Articles

The thermoplastic molding compositions according to the invention are prepared by mixing the particular constituents in a known manner and subjecting the mixture to melt compounding and melt extrusion at temperatures of from 200° C. to 300° C. in conventional units, such as internal kneaders, extruders and twin-shaft screws.

The mixing of the individual constituents may be carried out in a known manner either successively or simultaneously, and in particular either at about 20° C. (room temperature) or at a higher temperature.

In a preferred embodiment, component D or a part amount of component D is reacted with component B and/or C or a part amount of component B and/or C to give a precompound. The present invention therefore also provides compositions wherein at least one graft polymer selected from the group consisting of B) and C) or a part amount thereof and components D or a part amount of component D is employed in the form of a precompound prepared by compounding. A precompound of a graft polymer according to component C prepared in the emulsion polymerization process and a copolymer according to component D or a part amount of component D is particularly preferably employed, in a preferred embodiment this precompound being prepared by mixing the two components C and D in the melt at temperatures of from 200 to 260° C. with application of a vacuum.

In a particularly preferred embodiment, in the first step graft polymer B and/or C or a part amount of component B and/or C is mixed with component D or a part amount of component D by means of compounding with vacuum devolatilization to give a low-emission precompound. It is particularly advantageous to employ component B and/or C in the moist state (i.e. in the presence of water) in this devolatilizing compounding in accordance with the process which is described in EP 0 768 157 A1 and EP 0 867 463 A1. Precompounds in which the total content of volatile organic compounds is less than 400 mg/kg, preferably less than 300 mg/kg, in particular less than 200 mg/kg are particularly suitable. In the second process step, the remaining constituents and the precompound are mixed in a known manner and the mixture is subjected to melt compounding or melt extrusion at temperatures of from 200° C. to 300° C. in conventional units, such as internal kneaders, extruders and twin-shaft screws. In a preferred embodiment, a reduced pressure of <500 mbar, preferably <150 mbar, in particular <100 mbar is applied during this second compounding step for the purpose of further devolatilization of volatile constituents (such as e.g. residual monomers and residual solvent).

The present invention therefore also provides a process for the preparation of low-emission compositions according to the invention.

The molding compositions according to the invention may be used for the production of all types of shaped articles. These may be produced by injection molding, extrusion and the blow molding process. A further form of processing is the production of shaped articles by thermoforming from previously produced sheets or films.

Examples of such shaped articles are films, profiles, housing parts of all types, e.g. for domestic appliances, such as juice presses, coffee machines, mixers; for office machines, such as monitors, flat screens, notebooks, printers, copiers; sheets, pipes, electrical installation conduits, windows, doors and further profiles for the construction sector (interior finishing and exterior uses) as well as electrical and electronic components, such as switches, plugs and sockets, as well as vehicle body and interior components utility vehicles, in particular for the automobile sector.

The molding compositions according to the invention may also be used in particular, for example, for the production of the following shaped articles or moldings: interior finishing parts for track vehicles, ships, aircraft, busses and other motor vehicles, housings of electrical equipment containing small transformers, housings for equipment for processing and transmission of information, housings and facings for medical equipment, massage equipment and housings therefor, toy vehicles for children, flat wall elements, housings for safety equipment, thermally insulated transportation containers, moldings for sanitary and bath fittings, cover gratings for ventilator openings and housings for garden equipment.

The invention is further illustrated but is not intended to be limited by the following examples in which all parts and percentages are by weight unless otherwise specified.

EXAMPLES

Component A

Linear polycarbonate based on bisphenol A having a weight-average molecular weight $\overline{M}_w$ of 27,500 g/mol (determined by GPC).

Component B-1

ABS polymer prepared by bulk polymerization of 82 wt. %, based on the ABS polymer, of a mixture of 24 wt. % of acrylonitrile and 76 wt. % of styrene in the presence of 18 wt. %, based on the ABS polymer, of a polybutadiene/styrene block copolymer rubber having a styrene content of 26 wt. %. The weight-average molecular weight $\overline{M}_w$ of the free SAN copolymer content in the ABS polymer is 80,000 g/mol (measured by GPC in THF). The gel content of the ABS polymer is 24 wt. % (measured in acetone).

Component C-1

ABS polymer prepared by bulk polymerization of 85 wt. %, based on the ABS polymer, of a mixture of 23 wt. % of acrylonitrile and 77 wt. % of styrene in the presence of 15 wt. %, based on the ABS polymer, of a linear polybutadiene rubber. The weight-average molecular weight $\overline{M}_w$ of the free SAN copolymer content in the ABS polymer is 180,000 g/mol (measured by GPC in THF). The gel content of the ABS polymer is 25 wt. % (measured in acetone).

Component C-2

Precompound of 50 wt. % of an ABS polymer prepared by emulsion polymerization and 50 wt. % of an SAN copolymer. The precompound has an A:B:S weight ratio of 17:26:57 and is free from constituents or preparation-related impurities which catalyse the degradation of the polycarbonate under damp heat conditions. The weight-average molecular weight of the free SAN copolymer content in this ABS precompound is 150,000 g/mol. The weight content of the free copolymer of component C-2 is approx. 60 wt. %.

Component C-3

Precompound of 50 wt. % of an ABS polymer prepared by emulsion polymerization and 50 wt. % of an SAN copolymer. The precompound has an A:B:S weight ratio of 20:28:52. The grafting polymerization was carried out with Dresinate® 731, a sodium salt of disproportionated balsam resin (Abieta Chemie GmbH, Gersthofen, Germany) as the emulsifier. The emulsifier remains partly in the ABS as a result of the preparation. The weight-average molecular weight of the free SAN copolymer content in this ABS precompound is 100,000 g/mol. The weight content of the free copolymer of component C-3 is approx. 60 wt. %.

Component D

SAN copolymer having an acrylonitrile content of 23 wt. % and a weight-average molecular weight of 130,000 g/mol.

Component E

Bisphenol A-based oligophosphate

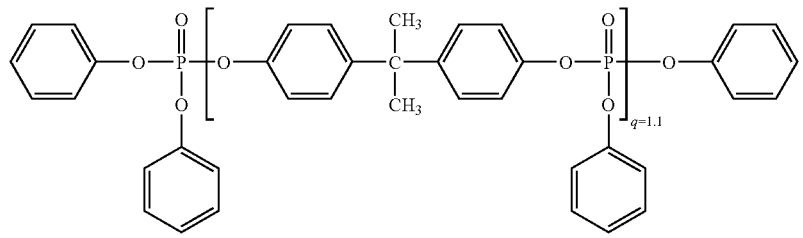

Component F

Component F-1 Pentaerythritol tetrastearate
Component F-2 Irganox B900 (manufacturer: Ciba Specialty Chemicals Inc., Basle, Switzerland)

Preparation and Testing of the Molding Compositions According to the Invention

The components of the compositions are mixed on a 3 l internal kneader.

The shaped articles are produced on an injection molding machine type Arburg 270 E as a rule at 260° C. However, for the purpose of evaluating the processing stability, in some cases test specimens are also produced at the elevated temperature of 300° C. or at 280° C. with three times the normal dwell time (280° C./3×) and are tested.

The melt viscosity is determined at 260° C. and a shear rate of 1,000 s$^{-1}$ in accordance with DIN 54811.

The determination of the notched impact strength $a_k$ is carried out in accordance with ISO 180/1 A at room temperature or at lower temperatures. The $a_k$ tough-brittle transition temperature is the temperature at which a tough or brittle fracture is observed in this notched impact experiment in about half of all the experiments carried out.

The puncture test is carried out by the method of ISO 6603-2 at room temperature or lower temperatures. Ep is the total energy uptake in this experiment, which is calculated as the integral of the force/elongation curve. The mean of 10 individual tests is stated. Furthermore, the fracture patterns of the individual test specimens are evaluated as to whether splinter-free failure occurs in the majority (>80%) of the experiments.

The stress-cracking resistance under the action of chemicals (ESC properties) is investigated on small bars of dimensions 80 mm×10 mm×4 mm. A hand lotion (Sebamed Hand+ Nail Balsam, Sebapharma GmbH & Co. KG, Boppard, Germany) is used as the test medium. The test specimens are pre-extended by means of a circular arc template (edge fiber elongation is 2.4%) and charged with the test medium at 23° C. The time until fracture under these conditions is determined.

The burning properties of the specimens is measured in accordance with UL-Subj. 94 V on small bars of dimensions 127×12.7×1.6 mm, produced on an injection molding machine at 260° C.

As a measure of the polycarbonate degradation in the compositions during ageing in a damp heat climate, the MVR is measured in accordance with ISO 1133 at 260° C. with a stamp load of 5 kg before and after storage at 95° C. and 100% relative atmospheric humidity for 7 days and the relative increase in the MVR is calculated according to the following formula:

$$MVR \text{ change} = \frac{MVR(\text{after ageing}) - MVR(\text{before ageing})}{MVR(\text{before ageing})} * 100\%$$

Graft polymers B and C are regarded as free from constituents or preparation-related impurities which catalyse the degradation of the polycarbonate under damp heat conditions if the polycarbonate compositions prepared on the basis of them show a relative increase in the MVR of not more than 100% in the storage test under damp heat conditions which is described above.

In the tables, the difference between the weight-average molecular weight $\Delta \overline{M}_w$ of the free (co)polymer in graft polymer B and the weight-average molecular weight of the free (co)polymer in graft polymer C or the difference between the weight average molecular weight of B and the proportional weight average molecular weight of the mixture of the free (co)polymer of C and (co)polymer D optionally added is stated, this is calculated in the context of the present invention in accordance with the following formula:

$$\Delta \overline{M}_W = \frac{(x * \overline{M}_W(\text{free copolymer from } C) + y * \overline{M}_w(\text{copolymer } D))}{x+y} - \overline{M}_w(\text{free copolymer from } B)$$

wherein
x is the weight content of the free copolymer from graft polymer C or of the precompound in the total composition and
y is the weight content of (co)polymer D in the total composition.

TABLE 1

Molding compositions and their properties

|  | 1 Comparison | 2 | 3 | 4 | 5 Comparison |
|---|---|---|---|---|---|
| Components [parts by wt.] | | | | | |
| A | 60 | 60 | 60 | 60 | 60 |
| B-1 | — | 10 | 20 | 30 | 40 |
| C-1 | 40 | 30 | 20 | 10 | — |
| F-1 | 0.75 | 0.75 | 0.75 | 0.75 | 0.75 |
| F-2 | 0.1 | 0.1 | 0.1 | 0.1 | 0.1 |
| Properties | | | | | |
| Melt viscosity (260° C./100 s$^{-1}$) [Pa·s] | 215 | 204 | 195 | 182 | 165 |
| $a_k(-20°)$ [kJ/m$^2$] | 42 | 50 | 52 | 44 | 24 |
| Fracture pattern | tough | tough | tough | tough | brittle |
| $a_k$ tough-brittle transition temperature [° C.] | −55 | −45 | −40 | −35 | −15 |
| Puncture test (−30° C.) Ep [J] Injection temperature: 260° C. | 46 | 48 | 54 | 51 | 45 |
| Puncture test (−30° C.) - mainly splinter-free fracture failure Injection temperature: 260° C. | yes | yes | yes | yes | no |
| Puncture test (−30° C.) Ep [J] Injection temperature: 300° C. | 45 | 50 | 52 | 49 | 43 |
| Puncture test (−30° C.) - mainly splinter-free fracture failure Injection temperature: 300° C. | yes | yes | yes | yes | no |
| ESC properties in hand lotion Time until fracture at $\in_r = 2.4\%$ [d] | >7 | >7 | >7 | >7 | 2 |
| MVR increase (7 d/95° C./100% atmospheric humidity) [%] | 14 | 13 | 15 | 7 | 9 |
| $\Delta \overline{M}_w$ (calculated) [g/mol] | — | 100,000 | 100,000 | 100,000 | — |

TABLE 2

Molding compositions comprising flameproofing agents and their properties

|  | 6 Comparison | 7 | 8 | 9 | 10 Comparison |
|---|---|---|---|---|---|
| Components [parts by wt.] | | | | | |
| A | 70 | 70 | 70 | 70 | 70 |
| B-1 | 16 | 12 | 8 | 4 | 0 |
| C-1 | 0 | 4 | 8 | 12 | 16 |
| E | 13 | 13 | 13 | 13 | 13 |
| F-1 | 0.4 | 0.4 | 0.4 | 0.4 | 0.4 |
| F-2 | 0.1 | 0.1 | 0.1 | 0.1 | 0.1 |
| Properties | | | | | |
| Melt viscosity (260° C./100 s$^{-1}$) [Pa·s] | 150 | 153 | 155 | 161 | 189 |

TABLE 2-continued

Molding compositions comprising flameproofing agents and their properties

|  | 6 Comparison | 7 | 8 | 9 | 10 Comparison |
|---|---|---|---|---|---|
| $a_k$(RT) [kJ/m$^2$] | 9 | 11 | 11 | 12 | 12 |
| Puncture test (RT) Ep [J] | 35 | 42 | 44 | 45 | 41 |
| Puncture test (RT) - mainly splinter-free fracture failure | no | yes | yes | yes | yes |
| UL 94V | V-1 | V-0 | V-0 | V-0 | V-0 |
| $\Delta\overline{M}_w$ (calculated) [g/mol] | — | 100,000 | 100,000 | 100,000 | — |

All the formulations in Table 2 additionally comprise 0.5% PTFE.

TABLE 3

Molding compositions and their properties

|  | 11 Comparison | 12 |
|---|---|---|
| Components [parts by wt.] |  |  |
| A | 58 | 60 |
| B-1 | 12.6 | 12.0 |
| C-2 | — | 20.4 |
| C-3 | 21.4 | — |
| D | 8.0 | 7.6 |
| F-1 | 0.75 | 0.75 |
| F-2 | 0.12 | 0.12 |
| Properties |  |  |
| Melt viscosity (260° C./100 s$^{-1}$) [Pa·s] | 202 | 207 |
| $a_k$(−20°) [kJ/m$^2$] | 39 | 38 |
| Fracture pattern | tough | tough |
| $a_k$ tough-brittle transition temperature [° C.] | −25 | −25 |
| Puncture test (−20° C.) Ep [J] Injection temperature: 260° C. | 48 | 51 |
| Puncture test (−20° C.) - mainly splinter-free fracture failure Injection temperature: 260° C. | yes | yes |
| Puncture test (−20° C.) Ep [J] Injection temperature: 280° C./3x | 8 | 22 |
| Puncture test (−20° C.) - mainly splinter-free fracture failure Injection temperature: 280° C./3x | no | yes |
| ESC properties in hand lotion Time until fracture at $\epsilon_r$ = 2.4% [d] | 2 | 2 |
| MVR increase (7 d/95° C./100% atmospheric humidity) [%] | 231 | 95 |
| $\Delta\overline{M}_w$ (calculated) [g/mol] | 31,516 | 62,339 |

It may be seen from the results shown in Tables 1 and 2 that the compositions according to the invention of Examples 2 to 4 and 7 to 9 have a ductility comparable to Comparison Examples 1 and 10, which comprise exclusively component C, with in some cases a considerably improved melt flowability (reduced melt viscosity). Comparison Examples 5 and 6, which comprise exclusively component B, indeed have a good melt flowability, but on the other hand an inadequate ductility.

The results shown in Table 1 furthermore show that the compositions according to the invention are distinguished by an excellent processing stability (ductility remains constant over a wide processing window) and stability on storage in a damp heat climate.

The results shown in Table 3 show that such properties not only may be achieved if a combination of two graft polymers prepared in the bulk polymerization process are employed as graft polymers B and C, but also may be realized with a combination of a bulk and an emulsion ABS as component B or C if the emulsion ABS is free from constituents, such as, for example, impurities from the emulsion polymerization process having a basic action, which catalyse the degradation of the polycarbonate under damp heat conditions.

Although the invention has been described in detail in the foregoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition consisting of:
   A) at least one member selected from the group consisting of aromatic polycarbonate and polyester carbonate,
   B) a first graft polymer,
   C) a second graft polymer, and
   D) an optional additional (co)polymer consisting of
      D.1) 50 to 99 wt. %, based on (co)polymer D, of at least one monomer selected from the group consisting of vinylaromatics, nucleus-substituted vinylaromatics and (meth)acrylic acid ($C_1$-$C_8$)-alkyl esters, and
      D.2) 1 to 50 wt. %, based on (co)polymer D, of at least one monomer selected from the group consisting of vinyl cyanides, (meth)acrylic acid ($C_1$-$C_8$)-alkyl esters, wherein D.1 differs from D.2,
   wherein
      said first graft polymer including a first grafted (co)polymer and a first free (co)polymer, and
      said second graft polymer including a second grafted (co)polymer and a second free (co)polymer,
         wherein the weight-average molecular weight of said first free (co)polymer is lower by at least 32,000 g/mol with regard to the weight-average molecular weight of said second free (co)polymer or, in the instance where D is present, with regard to the proportional weight-average molecular weight of said second free (co)polymer and said additional (co)polymer, and
   E) optional additional flameproofing agents, and
   F) optional additional polymer additives selected from the group consisting of flameproofing synergists, antidripping agents, lubricants, mold release agents, nucleating agents, antistatics, stabilizers, fillers and reinforcing substances, dyestuffs and pigments.

2. The composition according to claim 1, wherein the graft polymer B is present in an amount of 15 to 85% relative to the total weight of B, C and D.

3. The composition according to claim 1, wherein
A is present in an amount of 25 to 85 pbw,
B is present in an amount of 1 to 60 pbw,
C is present in an amount of 1 to 60 pbw, and
D is present in an amount of 0 to 40 pbw.

4. The composition according to claim 1, wherein the weight-average molecular weight of said first free (co)polymer is lower by at least 40,000 g/mol with regard to the weight-average molecular weight of said second free (co)polymer or, in the instance where D is present, with regard to the proportional weight-average molecular weight of said second free (co)polymer and said additional (co)polymer.

5. The composition according to claim 1, wherein the weight average molecular weight of said first free (co)polymer is 60,000 to 99,000 g/mol.

6. The composition according to claim 1, wherein said first graft polymer B includes a graft
B.1) 5 to 95%, based on the weight of component B, of a polymerized mixture of
   B.1.1) 65 to 85%, based on the weight of B.1, of at least one monomer selected from the group consisting of vinylaromatics, nucleus-substituted vinylaromatics and (meth)acrylic acid ($C_1$-$C_8$)-alkyl esters and
   B.1.2) 15 to 35%, based on the weight of B.1, of at least one monomer selected from the group consisting of vinyl cyanides, (meth)acrylic acid ($C_1$-$C_8$)-alkyl esters and derivatives of unsaturated carboxylic acids, with the proviso that said B.1.1 differs from B.1.2, on
B.2) 95 to 5% relative to the weight of component B of at least one graft base having a glass transition temperature of <0° C., and median particle size of 0.05 to 10 μm.

7. The composition according to claim 6, wherein said second graft polymer C includes a graft
C.1) 5 to 95%, based on the weight of component C, of a polymerized mixture of
   C.1.1) 65 to 85%, based on the weight of C.1, of at least one monomer selected from the group consisting of vinylaromatics, nucleus-substituted vinylaromatics and methacrylic acid ($C_1$-$C_8$)-alkyl esters and
   C.1.2) 15 to 35%, based on the weight of C.1, of at least one monomer selected from the group consisting of vinyl cyanides, (meth)acrylic acid ($C_1$-$C_8$)-alkyl esters and derivatives of unsaturated carboxylic acids, wherein C.1.1 differs from C.1.2, on
C.2) 95 to 5% based on the weight of component C of at least one graft base having a glass transition temperature of <0° C. and median particle size of 0.05 to 10 μm.

8. The composition according to claim 1, wherein graft polymers B and C are free from constituents or process-related impurities which catalytically degrade the polycarbonate under damp heat conditions.

9. A thermoplastic molding composition consisting of:
A) at least one member selected from the group consisting of aromatic polycarbonate and polyester carbonate,
B) a first graft polymer,
C) a second graft polymer,
D) an optional additional (co)polymer consisting of
   D.1) 50 to 99 wt. %, based on (co)polymer D, of at least one monomer selected from the group consisting of vinylaromatics, nucleus-substituted vinylaromatics and (meth)acrylic acid ($C_1$-$C_8$)-alkyl esters, and
   D.2) 1 to 50 wt. %, based on (co)polymer D, of at least one monomer selected from the group consisting of vinyl cyanides, (meth)acrylic acid ($C_1$-$C_8$)-alkyl esters, wherein D.1 differs from D.2, and
E) at least one additive selected from the group consisting of flameproofing agents, antidripping agents, lubricants, mold release agents, nucleating agents, antistatics, stabilizers, fillers, reinforcing substances, dyestuffs and pigments,
wherein
said first graft polymer including a first grafted (co)polymer and a first free (co)polymer, and
said second graft polymer including a second grafted (co)polymer and a second free (co)polymer,
wherein the weight-average molecular weight of said first free (co)polymer is lower by at least 32,000 g/mol with regard to the weight-average molecular weight of said second free (co)polymer or, in the instance where D is present, with regard to the proportional weight-average molecular weight of said second free (co)polymer and said additional (co)polymer.

10. The composition according to claim 1, wherein the weight average molecular weight $M_w$ of (co)polymer D is 50,000 to 200,000 g/mol.

11. The composition according to claim 1, wherein at least one graft polymer is employed in the form of a precompound consisting of one member from the first group B and C and one member from a second group consisting of the total amount of component D and a part amount of component D.

12. The composition according to claim 11, wherein the precompound consists of a graft polymer according to component C, prepared in the emulsion polymerization process, and a copolymer according to component D.

13. The composition according to claim 12, wherein the precompound is prepared by mixing the two components C and D in the melt at temperatures of from 200 to 260° C. with application of a vacuum.

14. The composition according to claim 1, wherein B is a product of bulk, solution or bulk-suspension polymerization process.

15. The composition according to claim 1, wherein B is a product of bulk, solution or bulk-suspension polymerization process and C is a product of emulsion polymerization process, said emulsion polymerization process characterized in either (i) the absence of an emulsifier from its grafting step, or (ii) the use as an emulsifier of a member selected from the group consisting of alkyl-, aryl- or alkylarylsulfonic acids and salts of each, alkyl-, aryl- or alkylaryl sulfates, alkyl-, aryl- or alkylarylphosphoric acids and the salts of each.

16. The composition according to claim 1, wherein B and C are products of bulk, solution or bulk-suspension polymerization processes.

17. Shaped articles comprising the composition according to claim 1.

* * * * *